(12) United States Patent
Chiba et al.

(10) Patent No.: US 8,411,212 B2
(45) Date of Patent: Apr. 2, 2013

(54) DISPLAY DEVICE

(75) Inventors: Dai Chiba, Osaka (JP); Takehiko Sakai, Osaka (JP); Tetsuo Fujita, Osaka (JP); Kazunori Morimoto, Osaka (JP); Yoshiharu Kataoka, Osaka (JP); Shogo Nishiwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 297 days.

(21) Appl. No.: 13/001,644

(22) PCT Filed: May 29, 2009

(86) PCT No.: PCT/JP2009/002397
§ 371 (c)(1),
(2), (4) Date: Dec. 28, 2010

(87) PCT Pub. No.: WO2010/029662
PCT Pub. Date: Mar. 18, 2010

(65) Prior Publication Data
US 2011/0102359 A1    May 5, 2011

(30) Foreign Application Priority Data

Sep. 9, 2008  (JP) ................................. 2008-230867

(51) Int. Cl.
*G02F 1/1335* (2006.01)
(52) U.S. Cl. ........................................................ 349/12
(58) Field of Classification Search ........................ 349/12
See application file for complete search history.

(56) References Cited

U.S. PATENT DOCUMENTS

| 6,501,529 | B1 | 12/2002 | Kurihara et al. |
| 8,130,209 | B2 * | 3/2012 | Chang ........................... 345/174 |
| 2006/0109222 | A1 | 5/2006 | Lee et al. |
| 2008/0055502 | A1 | 3/2008 | Wu et al. |
| 2008/0136980 | A1 | 6/2008 | Rho et al. |

FOREIGN PATENT DOCUMENTS

| JP | 2001-075074 A | 3/2001 |
| JP | 2002-287660 A | 10/2002 |
| JP | 2006-154815 A | 6/2006 |
| JP | 2007-047851 A | 2/2007 |
| JP | 2008-065302 A | 3/2008 |
| JP | 2008-146077 A | 6/2008 |

OTHER PUBLICATIONS

Official Communication issued in International Patent Application No. PCT/JP2009/002397, mailed on Aug. 18, 2009.

* cited by examiner

*Primary Examiner* — James Dudek
(74) *Attorney, Agent, or Firm* — Keating & Bennett, LLP (57) ABSTRACT

A touch electrode and a detection element are positioned in at least two of pixels. The touch electrode is formed in a first substrate, and is positioned so as to face a counter electrode. The touch electrode contacts the counter electrode and is electrically connected thereto when a second substrate is pressed and bent toward the first substrate. The detection element is connected to the touch electrode, and detects the electrical connection between the touch electrode and the counter electrode.

9 Claims, 11 Drawing Sheets

DISPLAY DEVICE

TECHNICAL FIELD

The present invention relates to display devices for detecting position information on a display screen.

BACKGROUND ART

In recent years, thin display devices such as liquid crystal displays (LCDs) have been widely used in various apparatuses such as personal computers, mobile phones, personal digital assistants (PDAs), and game machines. Display devices having a touch panel stacked on a display panel to detect position information on a display screen are also known in the art.

Examples of known types of touch panels include a resistance film type and an optical type.

In the resistance film type, a transparent conductive film is bonded to both the surface of a substrate bonded to a display panel, and the surface on the substrate side of a film bonded to the surface of the substrate with a small gap therebetween. The transparent conductive films contact each other at a position touched by a finger, a pen tip, etc., and a current flows therebetween, whereby the touched position is detected.

However, in the configuration in which the touch panel is stacked on the display panel, light is reflected from the surface of the display panel, the back surface of the touch panel, the inside of the touch panel, and the front surface of the touch panel, whereby display contrast is reduced.

Moire patterns are also produced by the interference between the reflected light beams, thereby reducing the display quality. Moreover, the structure in which the touch panel is stacked on the display panel increases the overall thickness of the display device, and also increases the weight thereof.

Thus, it is proposed to integrate a resistance film type touch panel with a display panel (see, e.g., Patent Documents 1 and 2).

Patent Document 1 discloses that first touch electrodes are stacked over gate lines and source lines of a TFT substrate of a liquid crystal display (LCD) panel, and second touch electrodes are stacked over a black matrix of a counter substrate of the LCD panel, so that the first and second touch electrodes are formed in a grid pattern.

Patent Document 2 discloses that a plurality of protruding portions are formed in a TFT substrate so as to protrude toward a counter substrate, and the surface of each protruding portion is covered by an electrode. Position information is detected by detecting a change in electric capacitance between the electrode on the protruding portion and a counter electrode, or a change in resistance of the electrode and the counter electrode.

CITATION LIST

Patent Document

PATENT DOCUMENT 1: Japanese Patent Publication No. 2001-075074
PATENT DOCUMENT 2: Japanese Patent Publication No. 2007-47851

SUMMARY OF THE INVENTION

Technical Problem

However, the configurations of Patent Documents 1-2 cannot simultaneously detect the positions of multiple points, namely two or more points, on the display screen.

On the other hand, in the optical type, optical sensors are provided in display pixels, and the position on the display screen touched by a finger or the like is detected by the optical sensors as light is blocked at the position. However, the optical sensors require a complex circuit in order to reliably detect position information according to the brightness of ambient light, which necessarily increases the device cost. Moreover, positioning the optical sensors in the pixels significantly reduces the aperture ratio of the pixels.

The present invention was developed in view of the above problems, and it is an object of the present invention to enable the positions of multiple points to be simultaneously detected with a thin configuration.

Solution to the Problem

In order to achieve the above object, a display device according to the present invention includes: a first substrate; a second substrate positioned so as to face the first substrate; and a display medium layer provided between the first substrate and the second substrate. A counter electrode is formed in the second substrate. A pixel electrode facing the counter electrode, and a switching element connected to the pixel electrode, for driving and switching the display medium layer, are formed in each of a plurality of pixels in the first substrate. A touch electrode and a detection element are positioned in at least two of the pixels. The touch electrode is formed in the first substrate and positioned so as to face the counter electrode. The touch electrode contacts the counter electrode and is electrically connected thereto when the second substrate is pressed and bent toward the first substrate. The detection element is connected to the touch electrode, and detects the electrical connection between the touch electrode and the counter electrode.

It is preferable that a first protruding portion, protruding toward the second substrate and having its surface covered by the touch electrode, be provided in the first substrate.

It is preferable that a second protruding portion, protruding toward the first substrate and having its surface covered by the counter electrode, be provided in the second substrate.

A gate line and a source line extending so as to cross the gate line may be connected to the switching element, and a first detection line extending along the gate line, and a second detection line extending along the source line may be connected to the detection element.

A gate line and a source line extending so as to cross the gate line may be connected to the switching element, and a first detection line extending along the gate line, and the source line may be connected to the detection element.

A gate line and a source line extending so as to cross the gate line may be connected to the switching element, and the gate line, and a second detection line extending along the source line may be connected to the detection element.

The display medium layer may be a liquid crystal layer.

A display device according to the present invention includes: a first substrate; a second substrate positioned so as to face the first substrate; and a display medium layer provided between the first substrate and the second substrate. A counter electrode is formed in the second substrate. A pixel electrode facing the counter electrode, and a switching element connected to the pixel electrode, for driving and switching the display medium layer, are formed in each of a plurality of pixels in the first substrate. At least two of the pixels are configured so that the pixel electrode contacts the counter electrode and is electrically connected thereto when the second substrate is pressed and bent toward the first substrate. A detection element connected to the pixel electrode, for detecting the electrical connection between the pixel electrode and the counter electrode, is positioned in the at least two of the pixels.

It is preferable that a protruding portion, protruding toward the first substrate and having its surface covered by the counter electrode, be provided in the second substrate.

It is preferable that a transmitting region and a reflecting region be formed in each of the plurality of pixels, and the protruding portion be positioned in the reflecting region.

A gate line and a source line extending so as to cross the gate line may be connected to the switching element, and a first detection line extending along the gate line, and a second detection line extending along the source line may be connected to the detection element.

A gate line and a source line extending so as to cross the gate line may be connected to the switching element, and a first detection line extending along the gate line, and the source line may be connected to the detection element.

A gate line and a source line extending so as to cross the gate line may be connected to the switching element, and the gate line, and a second detection line extending along the source line may be connected to the detection element.

The display medium layer may be a liquid crystal layer.

[Functions]

Functions of the present invention will be described below.

In the above display device, since the display medium layer such as, e.g., the liquid crystal layer, which is positioned between the counter electrode and each pixel electrode, is driven and switched by the switching element, whereby an image is displayed on a pixel-by-pixel basis.

First, in the case where the touch electrode and the detection element are positioned in the pixel, the touch electrode contacts the counter electrode and is electrically connected thereto when the second substrate is pressed and bent toward the first substrate.

It is preferable that the first protruding portion be provided in the first substrate or the second protruding portion be provided in the second substrate as this makes it easier for the touch electrode to contact the counter electrode when the second substrate is pressed.

The electrical connection between the touch electrode and the counter electrode is detected by the detection element. The detected signal is output via the first and second detection lines. The first detection line can also be used as the gate line, and the second detection line can also be used as the source line.

On the other hand, in the case where the pixel electrode has the function of the touch electrode, the pixel electrode contacts the counter electrode and is electrically connected thereto when the second substrate is pressed and bent toward the first substrate.

Moreover, it is preferable that the second protruding portion be provided in the second substrate as this makes it easier for the pixel electrode to contact the counter electrode when the second substrate is pressed.

The electrical connection between the pixel electrode and the counter electrode is detected by the detection element. The detected signal is output via the first and second detection lines. The first detection line can also be used as the gate line, and the second detection line can also be used as the source line.

It is preferable that the transmitting region and the reflecting region be formed in the pixel, as positioning the protruding portion in the reflecting region makes it easier for the counter electrode to contact the pixel electrode in the reflecting region when the second substrate is pressed.

Advantages of the Invention

According to the present invention, the touch electrode that contacts the counter electrode when the second substrate is pressed, and the detection element for detecting the electrical connection between the touch electrode and the counter electrode are positioned in at least two of the pixels. Thus, the positions of multiple points can be simultaneously detected with a thin configuration.

DESCRIPTION OF EMBODIMENTS

Embodiments of the present invention will be described in detail below with reference to the accompanying drawings. Note that the present invention is not limited to the following embodiments.

First Embodiment

Figure 1:
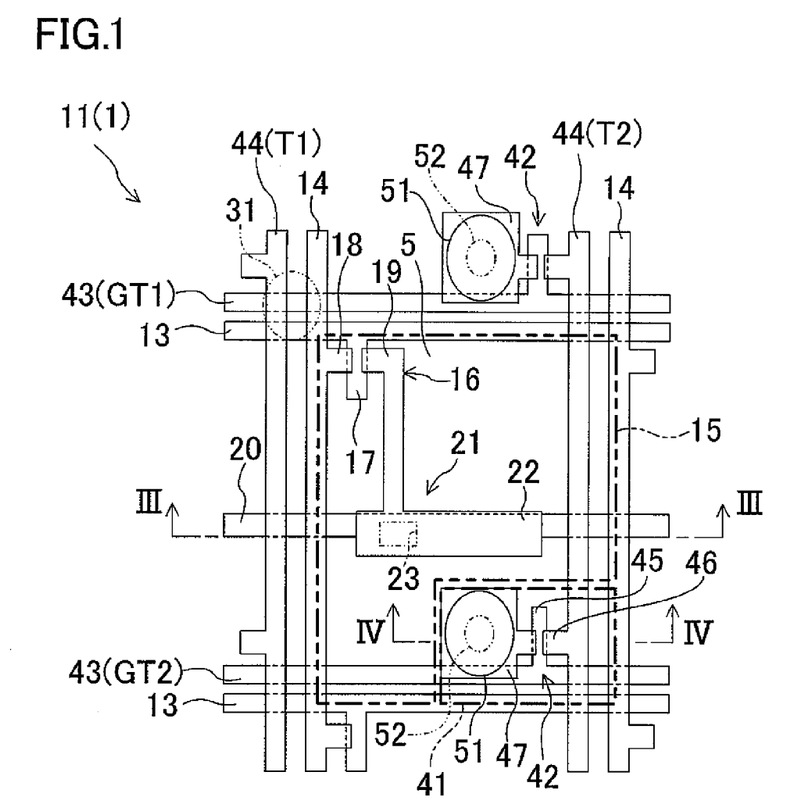
FIG. 1 is an enlarged plan view of a pixel of an LCD according to a first embodiment.
Figure 2:
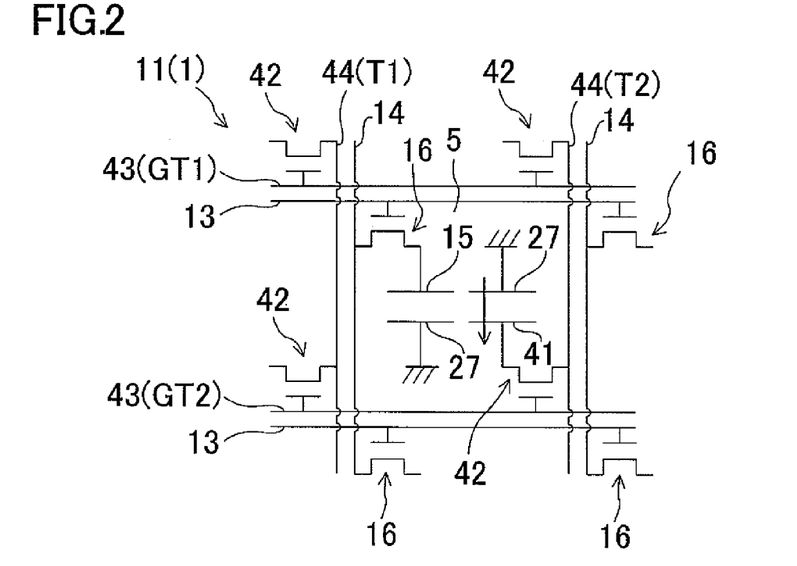
FIG. 2 is a circuit diagram showing a circuit configuration corresponding to FIG. 1.

FIGS. 1-5 show a first embodiment of the present invention.
FIG. 1 is an enlarged plan view of a pixel of an LCD according to the first embodiment. FIG. 2 is a circuit diagram showing a circuit configuration corresponding to FIG. 1. FIG.

Figure 3:
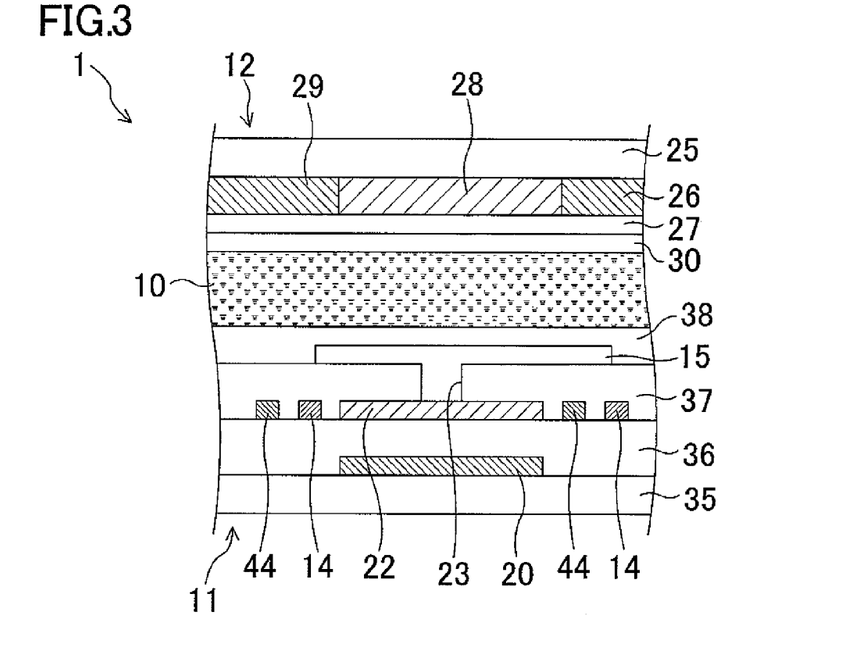
FIG. 3 is a cross-sectional view taken along line III-III in FIG. 1.
Figure 4:
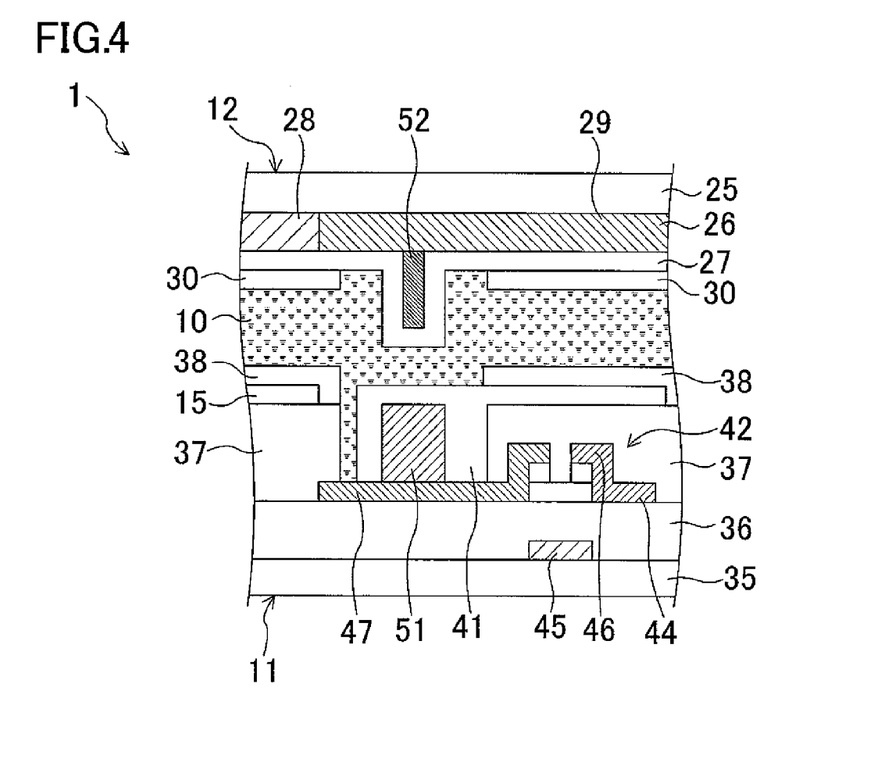
FIG. 4 is a cross-sectional view taken along line IV-IV in FIG. 1.

3 is a cross-sectional view taken along line III-III in FIG. 1. FIG. 4 is a cross-sectional view taken along line IV-IV in FIG. 1.

An LCD will be described as an example of the first embodiment. An LCD 1 of the first embodiment is configured as a transmissive LCD for providing transmissive display.

As shown in FIG. 3, the LCD 1 includes a TFT substrate 11 as a first substrate, a counter substrate 12 as a second substrate positioned so as to face the TFT substrate 11, and a liquid crystal layer 10 as a display medium layer provided between the counter substrate 12 and the TFT substrate 11.

Although not shown in the figures, the LCD 1 has a display region having, e.g., a rectangular shape, and a frame region as a non-display region formed in a frame shape so as to surround the display region. The display region is formed by a plurality of pixels 5 arranged in a matrix pattern.

As shown in FIG. 3, the counter substrate 12 has a glass substrate 25 having a thickness of, e.g., 0.7 mm or less, and a color filter layer 26 and a counter electrode (a common electrode) 27 which are sequentially stacked on the liquid crystal layer 10 side of the glass substrate 25. The color filter layer 26 includes colored layers 28 of red (R), green (G), and blue (B), and a black matrix 29 as a light shielding film.

The counter electrode 27 is made of, e.g., indium tin oxide (ITO), and is uniformly formed in the entire display region. Columnar spacers 31 for defining the thickness of the liquid crystal layer 10 (a so-called cell gap) are formed on the surface of the counter substrate 27. An alignment film 30 is formed on the surface on the liquid crystal layer 10 side of the counter electrode 27. A polarizer, not shown, is bonded to the surface on the opposite side of the glass substrate 25 from the liquid crystal layer 10.

On the other hand, the TFT substrate 11 is configured as a so-called active matrix substrate. The TFT substrate 11 has a glass substrate 35 having a thickness of, e.g., 0.7 mm or less, and as shown in FIGS. 1-2, a plurality of gate lines 13 are formed in the TFT substrate 11 so as to extend parallel to each other. A plurality of source lines 14 are also formed in the TFT substrate 11 so as to cross the gate lines 13. Thus, the lines, which are formed by the gate lines 13 and the source lines 14, are formed in a grid pattern in the TFT substrate 11.

As shown in FIGS. 1-2, each pixel 5 is formed by a rectangular region defined by the gate lines 13 and the source lines 14. A pixel electrode 15 facing the counter electrode 27, and a thin film transistor (TFT) 16 as a switching element connected to the pixel electrode 15, for driving and switching the liquid crystal layer 10, are formed in each pixel 5.

The TFT 16 is positioned at, e.g., the upper left corner of the pixel 5 in FIGS. 1-2, and includes a gate electrode 17 connected to the gate line 13, a source electrode 18 connected to the source line 14, and a drain electrode 19 connected to the pixel electrode 15. That is, the gate line 13 and the source line 14 are connected to the TFT 16.

The drain electrode 19 extends to the middle of the pixel 5, and a capacitor electrode 22 is formed at the tip end of the drain electrode 19. As shown in FIG. 3, the capacitor electrode 22 is covered by an interlayer insulating film 37, and a contact hole 23 is formed on top of the capacitor electrode 22 in the interlayer insulating film 37. The drain electrode 19 is connected to the pixel electrode 15 via the capacitor electrode 22 and the contact hole 23.

Thus, with a scanning voltage being applied to the gate electrode 17 via the gate line 13, a signal voltage is supplied from the source line 14 to the pixel electrode 15 via the source electrode 18 and the drain electrode 19.

A plurality of capacitor lines 20 are formed parallel to each other in the TFT substrate 11 so as to extend substantially along the centerline of each pixel 5. As shown in FIG. 3, an insulating film 36 is interposed between the capacitor line 20 and the capacitor electrode 22, and a capacitor element 21, which is also called as an "auxiliary capacitor," is formed by the capacitor line 20, the capacitor electrode 22, and the insulating film 36. The capacitor element 21 is formed in each pixel 5 to maintain a substantially constant display voltage in each pixel 5.

As shown in FIGS. 1 and 3, the capacitor line 20 and the gate lines 13 are formed on the surface of the glass substrate 35, and are covered by the insulating film 36. The capacitor electrode 22 and the source lines 14 are formed on the surface of the insulating film 35, and are covered by the interlayer insulating film 37. The pixel electrode 15 is formed on the surface of the interlayer insulating film 37, and is covered by an alignment film 38.

If a scanning signal is supplied from the gate line 13 to the gate electrodes 17 of the TFTs 16 in a line of pixels 5, a predetermined signal voltage is written from the source lines 14 to the pixel electrodes 15 via the source electrodes 18 and the drain electrodes 19 of the TFTs 16 in these pixels 5. As a result, the liquid crystal layer 10 of these pixels 5 is driven by the signal voltage applied between the pixel electrodes 15 and the counter electrode 27, whereby a desired image is displayed.

As shown in FIGS. 1 and 4, a touch electrode 41 and a detection element 42 connected thereto are formed in each pixel 5 in the TFT substrate 11.

The detection element 42 is positioned at, e.g., the lower right corner of each pixel 5 in FIG. 1, and is formed by a TFT. A first detection line 43 extending along the gate line 13, and a second detection line 44 extending along the source line 14 are connected to the detection element 42. That is, the detection element 42 has a gate portion 45 connected to the first detection line 43, a source portion 46 connected to the second detection line 44, and a drain portion 47 in the shape of a substantially rectangular plate. As shown in FIG. 4, the source portion 46 is covered by the interlayer insulating film 37, but the drain portion 47 is not covered by the interlayer insulating film 37.

As shown in FIGS. 1 and 4, a first protruding portion 51 is formed on the drain portion 47 in the TFT substrate 11 so as to protrude toward the counter substrate 12. The first protruding portion 51 is formed in, e.g., a columnar shape, and the surface of the first protruding portion 51 is covered by the touch electrode 41.

As shown in FIG. 1, the touch electrode 41 is positioned in a cutout portion of the pixel electrode 15 in each pixel 5. The touch electrode 41 is formed so that the surface of the touch electrode 41 is flush with the pixel electrode 15, and the touch electrode 41 is positioned so as to face the counter electrode 27. As shown in FIG. 1, the detection element 42 is covered by the touch electrode 41. The touch electrode 41 is made of ITO, and is formed in the same step as the pixel electrode 15.

The alignment film 38 covers the pixel electrode 15 and a part of the touch electrode 41, but is not formed near the first protruding portion 51.

On the other hand, a second protruding portion 52 is formed on the surface of the black matrix 29 so as to protrude toward the TFT substrate 11. The second protruding portion 52 is positioned above the first protruding portion 51 so as to face the first protruding portion 51. The second protruding portion 52 is formed in, e.g., a columnar shape, and is made of the same material as that of the columnar spacers 31, and the surface of the second protruding portion 52 is covered by the counter electrode 27. The outer diameter of the second protruding portion 52 is smaller than that of the first protruding portion 51.

The alignment film 30 covers most of the counter electrode 27, but is not formed near the second protruding portion 52.

Thus, when the counter substrate 12 is pressed and bent toward the TFT substrate 11, the counter electrode 27 under the second protruding portion 52 contacts the touch electrode 41 on top of the first protruding portion 51, and the counter electrode 27 is electrically connected to the touch electrode 41. The detection element 42 is configured to detect the electrical connection between the touch electrode 41 and the counter electrode 27.

[Method for Detecting Touched Position]

Figure 5:
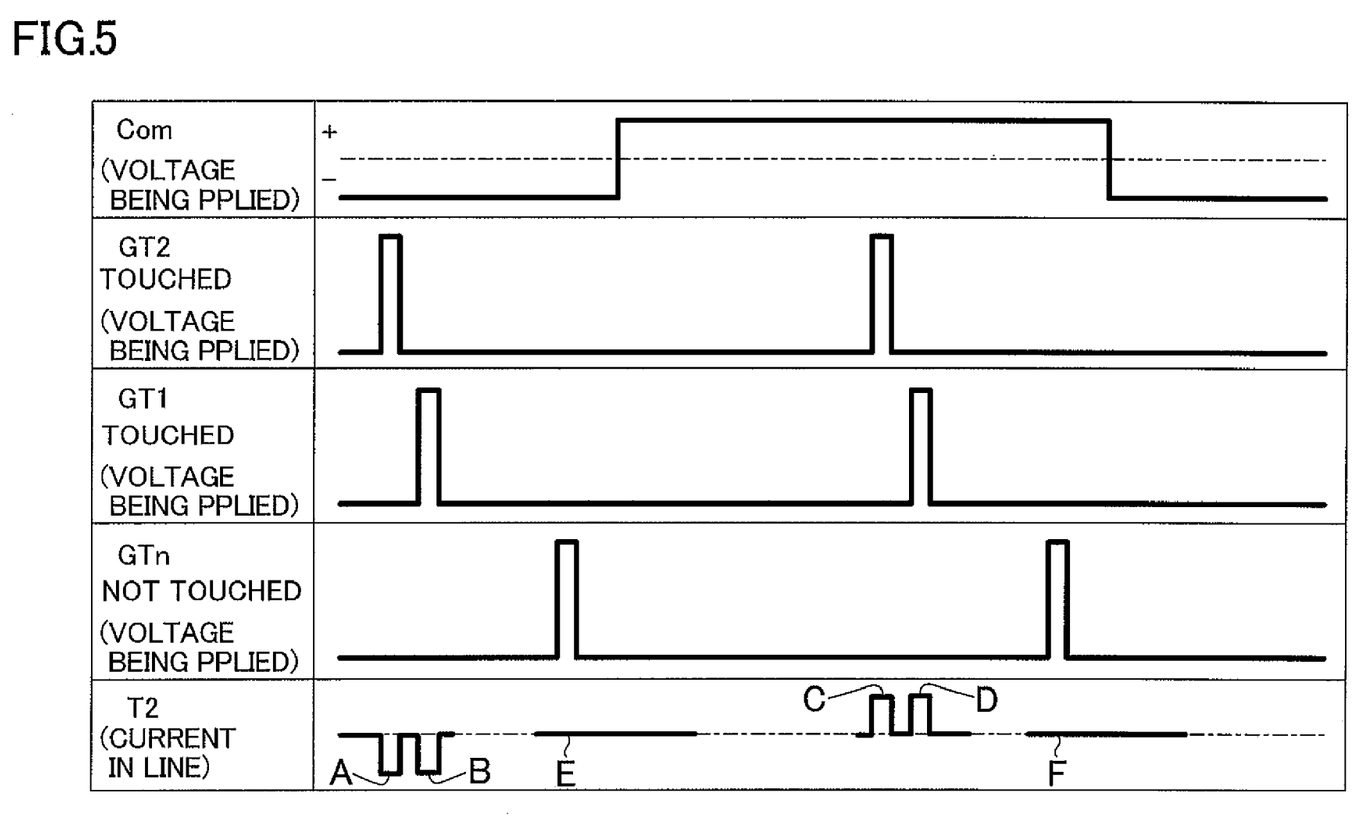
FIG. 5 is a timing chart illustrating the operation of detecting a touched position.

A method for detecting a touched position by the LCD 1 will be described below with reference to FIG. 5. FIG. 5 is a timing chart illustrating the operation of detecting a touched position.

In FIG. 5, "Com" represents the counter electrode 27. An alternating current (AC) voltage of, e.g., ±1 V is applied to the counter electrode 27.

"GT1" represents the upper first detection line 43 in FIG. 1, and "GT2" represents the lower first detection line 43 in FIG. 1. "GTn" represents the $n^{th}$ first detection line 43 from GT1. "T2" represents the right second detection line 44 in FIG. 1.

First, the detection element 42 (GT2-T2) connected to the first detection line 43 (GT2) and the second detection line 44 (T2) will be described.

If a predetermined scanning voltage is applied to the first detection line 43 (GT2), the drain portion 47 of the detection element 42 (GT2-T2) is electrically connected to the source portion 46 thereof, whereby the detection element 42 (GT2-T2) is turned on. At this time, if the counter substrate 12 has been touched, and the counter electrode 27 is in contact with the touch electrode 41 connected to the detection element 42 (GT2-T2), a current flows through the second detection line 44 (T2) according to the positive or negative voltage being applied to the counter electrode 27 (see the reference characters "A" and "C" in FIG. 5). The touched position is detected by detecting this current.

Next, the detection element 42 (GT1-T2) connected to the first detection line 43 (GT1) and the second detection line 44 (T2) will be described.

If a predetermined scanning voltage is applied to the first detection line 43 (GT1), the drain portion 47 of the detection element 42 (GT1-T2) is similarly electrically connected to the source portion 46 thereof, whereby the detection element 42 (GT1-T2) is turned on. At this time, if the counter substrate 12 has been touched, and the counter electrode 27 is in contact with the touch electrode 41 connected to the detection element 42 (GT1-T2), a current flows through the second detection line 44 (T2) according to the positive or negative voltage being applied to the counter electrode 27 (see the reference characters "B" and "D" in FIG. 5). The touched position is detected by detecting this current.

Next, the detection element 42 (GTn-T2) connected to the first detection line 43 (GTn) and the second detection line 44 (T2) will be described.

If a predetermined scanning voltage is applied to the first detection line 43 (GTn), the drain portion 47 of the detection element 42 (GTn-T2) is similarly electrically connected to the source portion 46 thereof, whereby the detection element 42 (GTn-T2) is turned on. However, if the counter substrate 12 has not been touched, and the counter electrode 27 is not in contact with the touch electrode 41 connected to the detection element 42 (GTn-T2), no current flows through the second detection line 44 (T2) (see the reference characters "E" and "F" in FIG. 5). In this case, no touched position is detected, and "non-contact" is detected.

Advantages of First Embodiment

Thus, according to the first embodiment, the touch electrode 41, which contacts the counter electrode 27 when the counter substrate 12 is pressed, and the detection element 42 for detecting electrical connection between the touch electrode 41 and the counter electrode 27 are provided in each pixel 5. This enables the configuration with a small overall thickness to be implemented, and enables the touched positions of multiple points to be simultaneously detected.

Moreover, since a plurality of optical sensors are not provided, the touched position can be accurately detected with a simple configuration, regardless of the brightness of ambient light. In addition, the device cost can be reduced, and a decrease in aperture ratio can reduced, whereby the display quality can be increased.

Furthermore, since the first protruding portion 51 is provided in the TFT substrate 11, and the second protruding portion 52 is provided in the counter substrate 12, the touch electrode 41 can more easily contact the counter electrode 27 when the counter substrate 12 is pressed. Thus, the detection accuracy of the touched position can be increased.

Since the first detection lines 43 and the second detection lines 44 are connected to each detection element 42, the touched position can always be detected in all the second detection lines 44 independently of the display control by the gate lines 13 and the source lines 14. Thus, the detection accuracy can further be increased.

Second Embodiment

Figure 6:
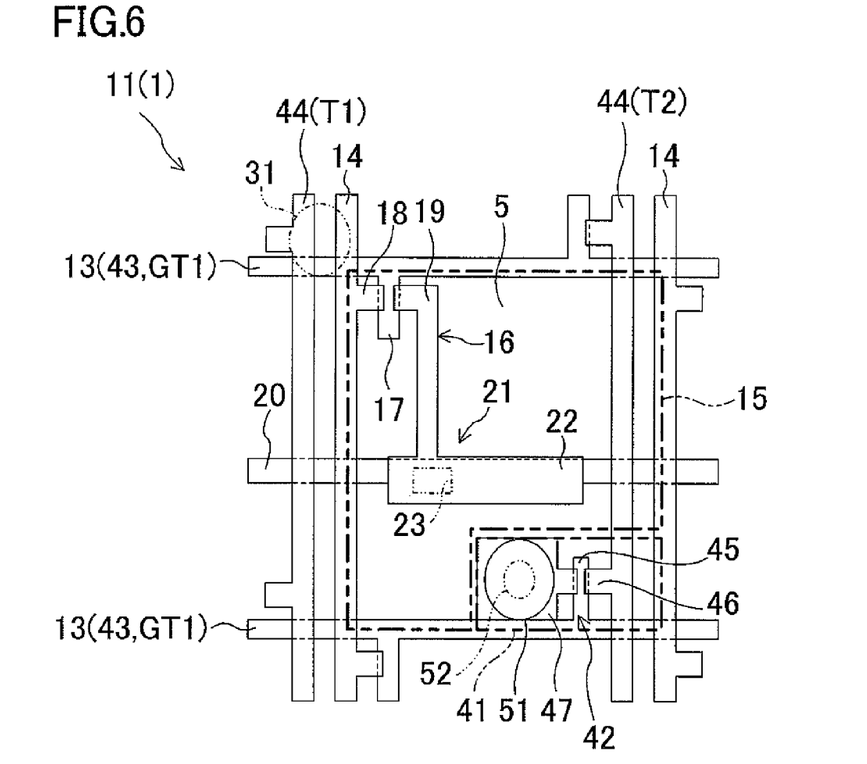
FIG. 6 is an enlarged plan view of a pixel of an LCD according to a second embodiment.
Figure 7:
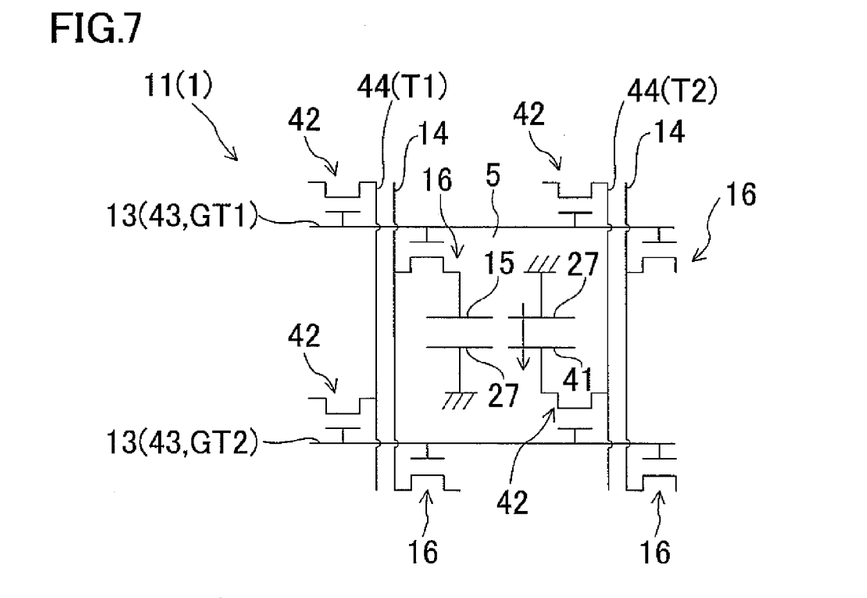
FIG. 7 is a circuit diagram showing a circuit configuration corresponding to FIG. 6.

FIGS. 6-7 show a second embodiment of the present invention.

FIG. 6 is an enlarged plan view of a pixel of an LCD according to the second embodiment. FIG. 7 is a circuit diagram showing a circuit configuration corresponding to FIG. 6. Note that in the following embodiments, the same parts as those of FIGS. 1-5 are denoted with the same reference characters, and detailed description thereof will be omitted.

In the first embodiment, the first detection lines 43 and the second detection lines 44 are connected to the detection elements 42 separately and independently of the gate lines 13 and the source lines 14 which are connected to the TFTs 16 for display, whereas in the second embodiment, the first detection lines 43 serve also as the gate lines 13.

That is, as shown in FIGS. 6-7, the gate electrodes 17 of the TFTs 16 and the gate portions 45 of the detection elements 42 are connected to the gate lines 13. On the other hand, the source lines 14 are connected to the source electrodes 18 of the TFTs 16, whereas the second detection lines 44 are connected to the source portions 46 of the detection elements 42.

Thus, if a scanning signal for display is supplied to the TFTs 16 via the gate lines 13, this signal is also supplied to the gate portions 45 of the detection elements 42. At this time, if the counter substrate 12 has been touched, and the touch electrode 41 is in contact with the counter electrode 27, a current according to the voltage being applied to the counter electrode 27 flows from the detection element 42 to the second detection line 44. The touched position is detected based on the current flowing though the second detection line 44. That is, according to the configuration of the second embodiment, writing of the display signal is performed simultaneously with detection of the touched position in the pixels 5 of each scanning line.

Advantages of Second Embodiment

According to the second embodiment, since the touch electrode 41 and the detection element 42 are provided in each pixel 5, advantages similar to those of the first embodiment can be obtained. Moreover, since the first detection lines 43 serve also as the gate lines 13, the number of lines is reduced, whereby the aperture ratio of the pixels 5 can be increased.

Third Embodiment

Figure 8:
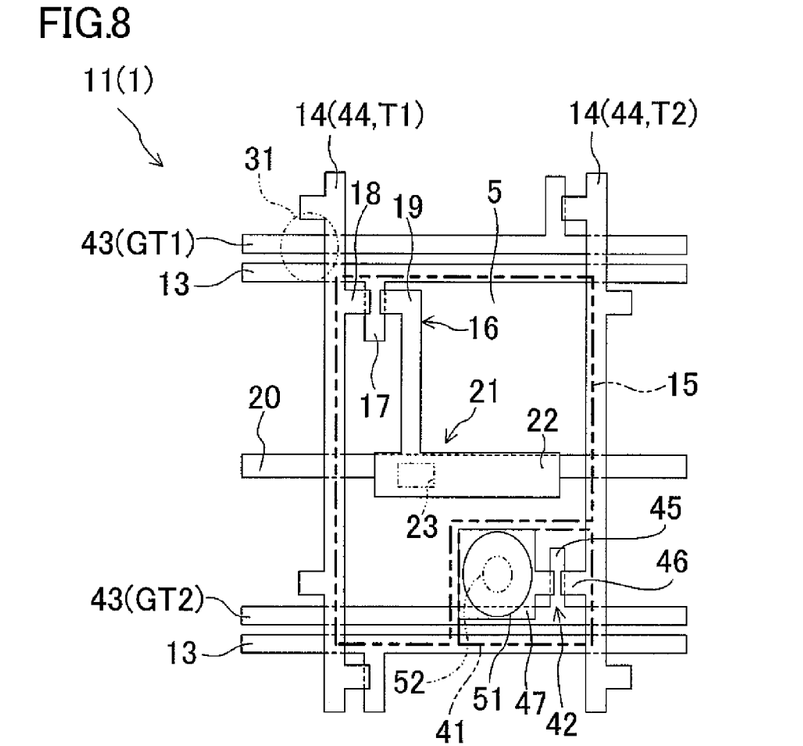
FIG. 8 is an enlarged plan view of a pixel of an LCD according to a third embodiment.
Figure 9:
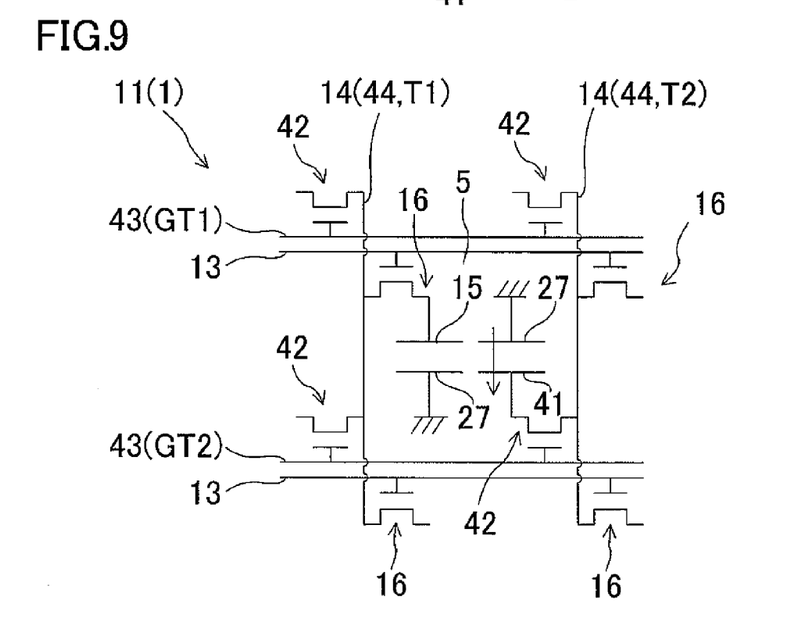
FIG. 9 is a circuit diagram showing a circuit configuration corresponding to FIG. 8.

FIGS. 8-9 show a third embodiment of the present invention.

FIG. 8 is an enlarged plan view of a pixel of an LCD according to the third embodiment. FIG. 9 is a circuit diagram showing a circuit configuration corresponding to FIG. 8.

In the first embodiment, the first detection lines 43 and the second detection lines 44 are connected to the detection elements 42 separately and independently of the gate lines 13 and the source lines 14 which are connected to the TFTs 16 for display, whereas in the third embodiment, the second detection lines 44 serve also as the source lines 14.

That is, as shown in FIGS. 8-9, the source electrodes 18 of the TFTs 16 and the source portions 46 of the detection elements 42 are connected to the source lines 14. On the other hand, the gate lines 13 are connected to the gate electrodes 17 of the TFTs 16, whereas the first detection lines 43 are connected to the gate portions 45 of the detection elements 42.

Thus, if the touch electrode 41 is in contact with the counter electrode 27 when a signal voltage is supplied to the gate portion 45 of the detection element 42 via the first detection line 43, a current according to the voltage being applied to the counter electrode 27 flows from the detection element 42 to the source line 14. The touched position is detected based on the current flowing though the source line 14.

Advantages of Third Embodiment

According to the third embodiment, since the touch electrode 41 and the detection element 42 are provided in each pixel 5, advantages similar to those of the first embodiment can be obtained. Moreover, since the second detection lines 44 serve also as the source lines 14, the number of lines is reduced, whereby the aperture ratio of the pixels 5 can be increased.

Fourth Embodiment

Figure 10:
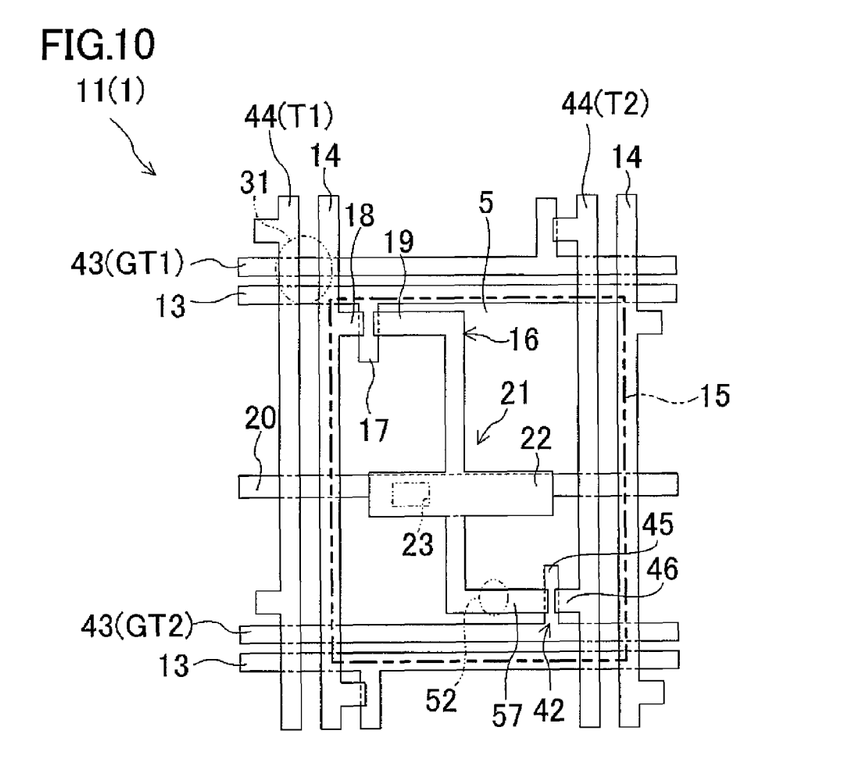
FIG. 10 is an enlarged plan view of a pixel of an LCD according to a fourth embodiment.
Figure 11:
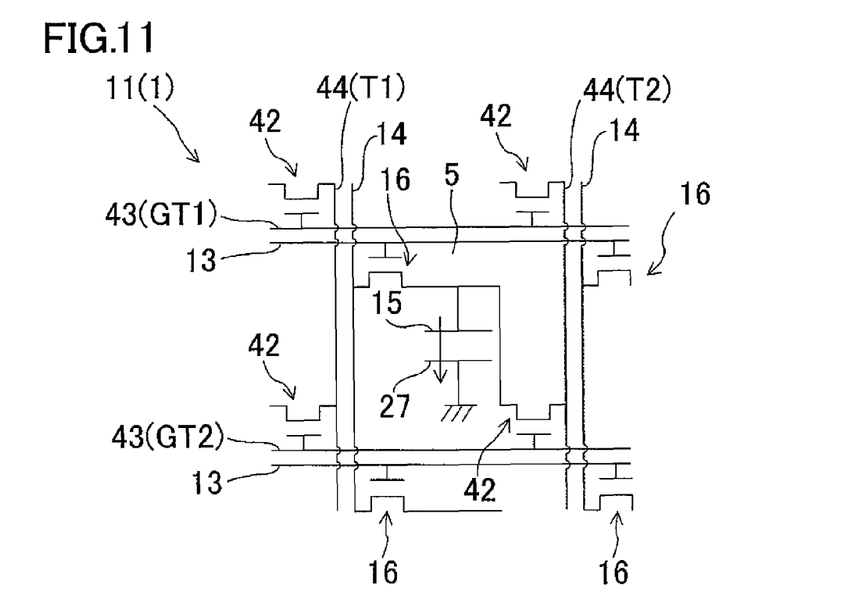
FIG. 11 is a circuit diagram showing a circuit configuration corresponding to FIG. 10.

FIGS. 10-11 show a fourth embodiment of the present invention.

FIG. 10 is an enlarged plan view of a pixel of an LCD according to the fourth embodiment. FIG. 11 is a circuit diagram showing a circuit configuration corresponding to FIG. 10.

In the first embodiment, the touch electrodes 41 are provided separately and independently of the pixel electrodes 15, whereas in the fourth embodiment, the pixel electrodes 15 serve also as the touch electrodes 41.

That is, as shown in FIGS. 10-11, in the detection element 42 of the fourth embodiment, a drain portion 57 is formed in the shape of a line, and the tip end of the drain portion 57 is connected to the capacitor electrode 22. That is, both the drain portion 57 of the detection element 42 and the drain electrode 19 of the TFT 16 are connected to the capacitor electrode 22. Thus, the TFT 16 and the detection element 42 are connected to the pixel electrode 15 via the contact hole 23 and the capacitor electrode 22.

As in the first embodiment, the first detection line 43 is connected to the gate portion 45 of the detection element 42, whereas the second detection line 44 is connected to the source portion 46 of the detection element 42.

Although the second protruding portion 52 is provided in the counter substrate 12, no first protruding portion 51 is provided in the TFT substrate 11. As shown in FIG. 10, the second protruding portion 52 is positioned so as to partially overlap the drain portion 57 as viewed from the direction normal to the surface of the TFT substrate 11.

Thus, each pixel 5 is configured so that the pixel electrode 15 contacts the counter electrode 27 and is electrically connected thereto when the counter substrate 12 is pressed and bent toward the TFT substrate 11. On the other hand, each detection element 42 is configured to detect the electrical conduction between the pixel electrode 15 and the counter electrode 27.

Advantages of Fourth Embodiment

According to the fourth embodiment, since the detection element 42 is provided in each pixel 5, advantages similar to those of the first embodiment can be obtained. Moreover, since no touch electrode 41 is provided, the size of the pixel electrode 15 can be increased, whereby the aperture ratio can be increased, and the display quality can be increased.

Furthermore, since the first detection line 43 and the second detection line 44 are connected to each detection element 42, the touched position can always be detected in all the second detection lines 44 independently of the display control by the gate lines 13 and the source lines 14. Thus, the detection accuracy can further be increased.

Fifth Embodiment

Figure 12:
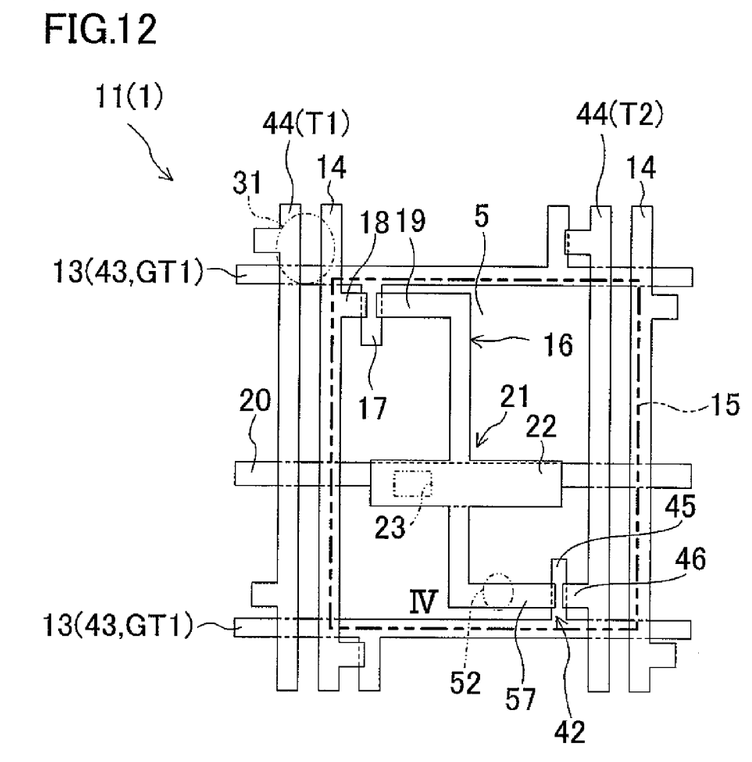
FIG. 12 is an enlarged plan view of a pixel of an LCD according to a fifth embodiment.
Figure 13:
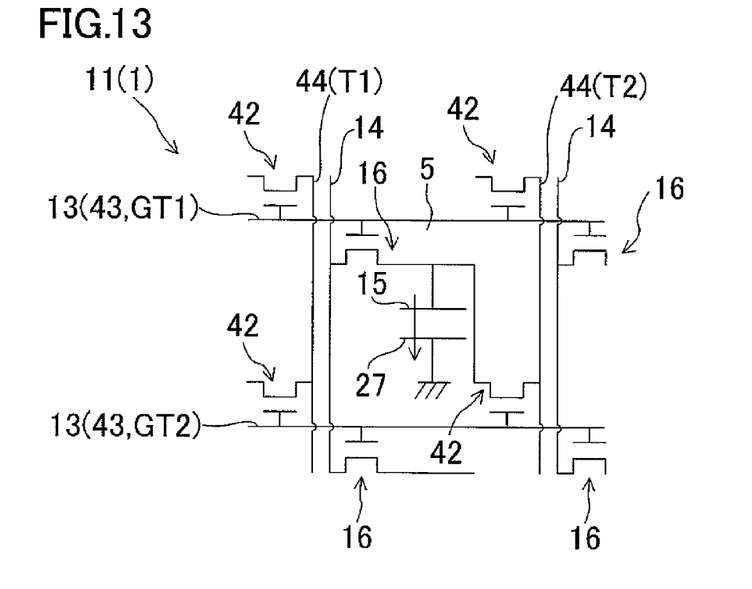
FIG. 13 is a circuit diagram showing a circuit configuration corresponding to FIG. 12.

FIGS. 12-13 show a fifth embodiment of the present invention.

FIG. 12 is an enlarged plan view of a pixel of an LCD according to the fifth embodiment. FIG. 13 is a circuit diagram showing a circuit configuration corresponding to FIG. 12.

In the fourth embodiment, the first detection lines 43 and the second detection lines 44 are connected to the detection elements 42 separately and independently of the gate lines 13 and the source lines 14 which are connected to the TFTs 16 for display, whereas in the fifth embodiment, the first detection lines 43 serve also as the gate lines 13.

That is, as shown in FIGS. 12-13, the gate electrodes 17 of the TFTs 16 and the gate portions 45 of the detection elements 42 are connected to the gate lines 13. On the other hand, the source lines 14 are connected to the source electrodes 18 of the TFTs 16, whereas the second detection lines 44 are connected to the source portions 46 of the detection elements 42.

Thus, if a scanning signal for display is supplied to the TFTs 16 via the gate line 13, this signal is supplied also to the gate portions 45 of the detection elements 42. At this time, if the counter substrate 12 has been touched, and the pixel electrode 15 is in contact with the counter electrode 27, a current according to the voltage being applied to the counter electrode 27 flows from the detection element 42 to the second detection line 44. The touched position is detected based on the current flowing through the second detection line 44. That is, according to the configuration of the fifth embodiment, writing of the display signal is performed simultaneously with detection of the touched position in the pixels 5 of each scanning line.

Advantages of Fifth Embodiment

According to the fifth embodiment, since the detection element 42 is provided in each pixel 5, and the pixel electrodes 15 serve also as the touch electrodes 41, advantages similar to those of the fourth embodiment can be obtained. Moreover, since the first detection lines 43 serve also as the gate lines 13, the number of lines is reduced, and the aperture ratio of the pixels 5 can further be increased.

Sixth Embodiment

Figure 14:
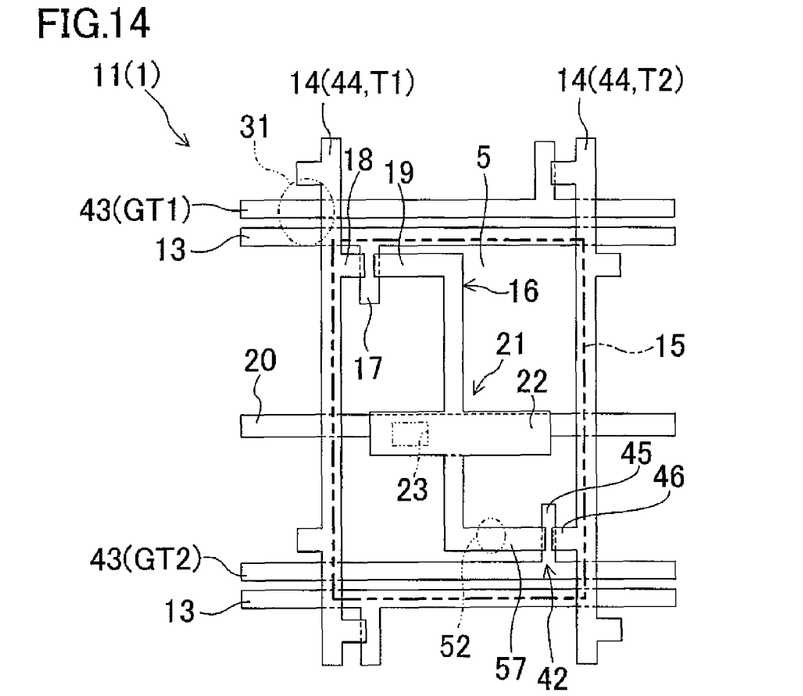
FIG. 14 is an enlarged plan view of a pixel of an LCD according to a sixth embodiment.
Figure 15:
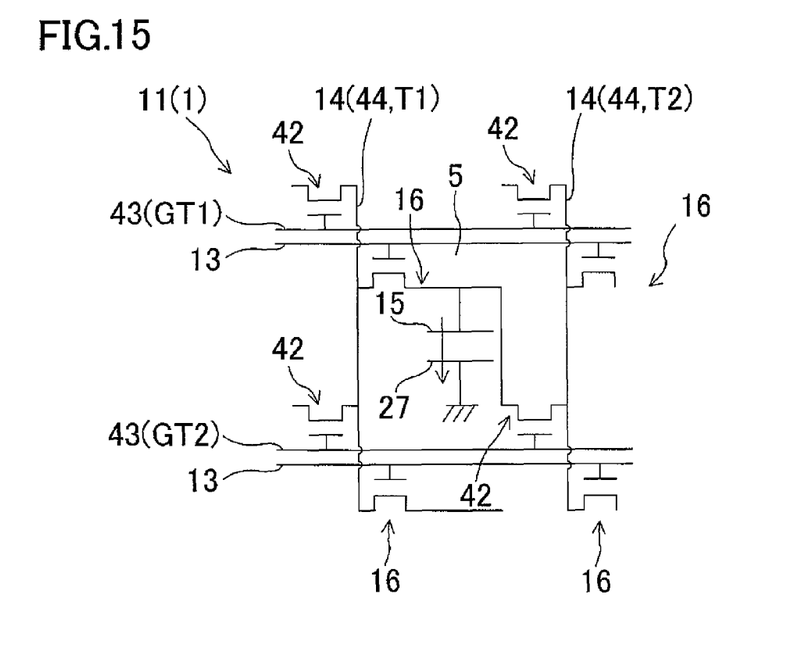
FIG. 15 is a circuit diagram showing a circuit configuration corresponding to FIG. 14.

FIGS. 14-15 show a sixth embodiment of the present invention.

FIG. 14 is an enlarged plan view of a pixel of an LCD according to the sixth embodiment. FIG. 15 is a circuit diagram showing a circuit configuration corresponding to FIG. 14.

In the fourth embodiment, the first detection lines 43 and the second detection lines 44 are connected to the detection elements 42 separately and independently of the gate lines 13 and the source lines 14 which are connected to the TFTs 16 for display, whereas in the sixth embodiment, the second detection lines 44 serve also as the source lines 14.

That is, as shown in FIGS. 14-15, the source electrodes 18 of the TFTs 16 and the source portions 46 of the detection elements 42 are connected to the source lines 14. On the other hand, the gate lines 13 are connected to the gate electrodes 17 of the TFTs 16, whereas the first detection lines 43 are connected to the gate portions 45 of the detection elements 42.

Thus, if the pixel electrode 15 is in contact with the counter electrode 27 when a signal voltage is supplied to the gate portion 45 of the detection element 42 via the first detection line 43, a current according to the voltage being applied to the counter electrode 27 flows from the detection element 42 to the source line 14. The touched position is detected based on the current flowing though the source line 14.

Advantages of Sixth Embodiment

According to the sixth embodiment, since the detection element 42 is provided in each pixel 5, and the pixel electrodes 15 serve also as the touch electrodes 41, advantages similar to those of the fourth embodiment can be obtained. Moreover, since the second detection lines 44 are used also as the source lines 14, the number of lines is reduced, whereby the aperture ratio of the pixels 5 can be increased.

Seventh Embodiment

Figure 16:
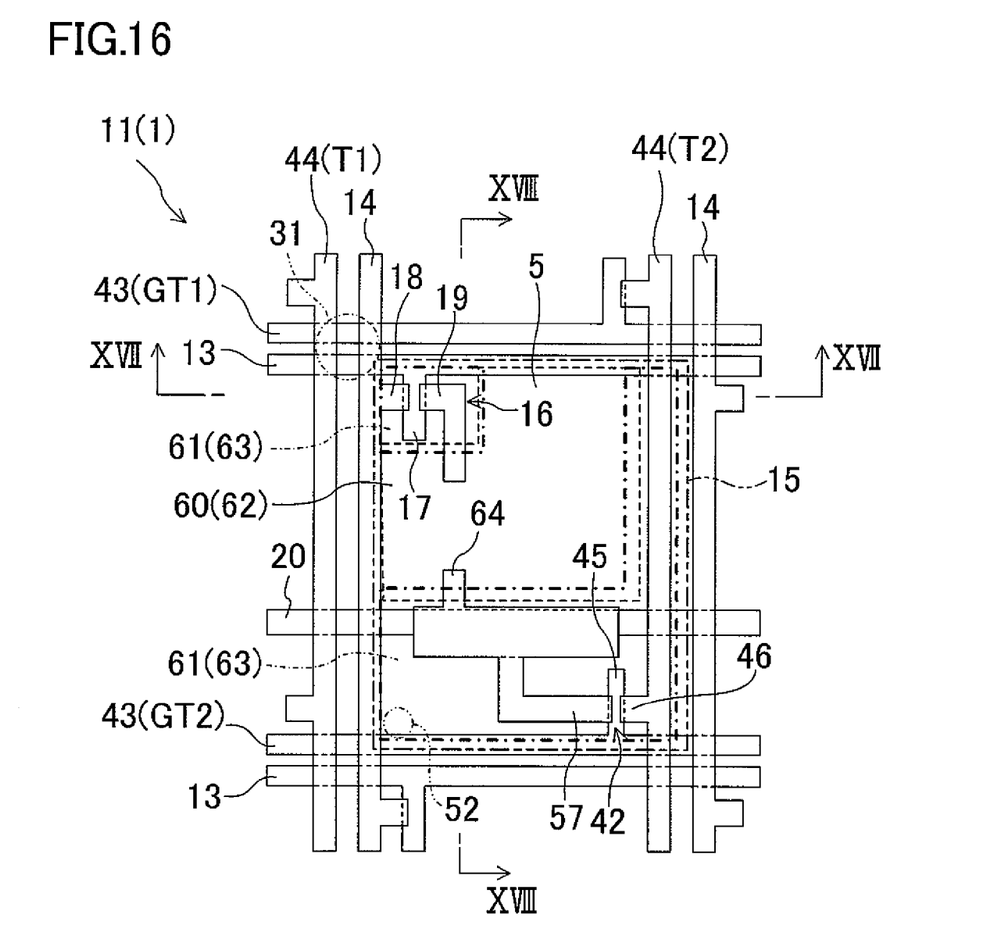
FIG. 16 is an enlarged plan view of a pixel of an LCD according to a seventh embodiment.
Figure 17:
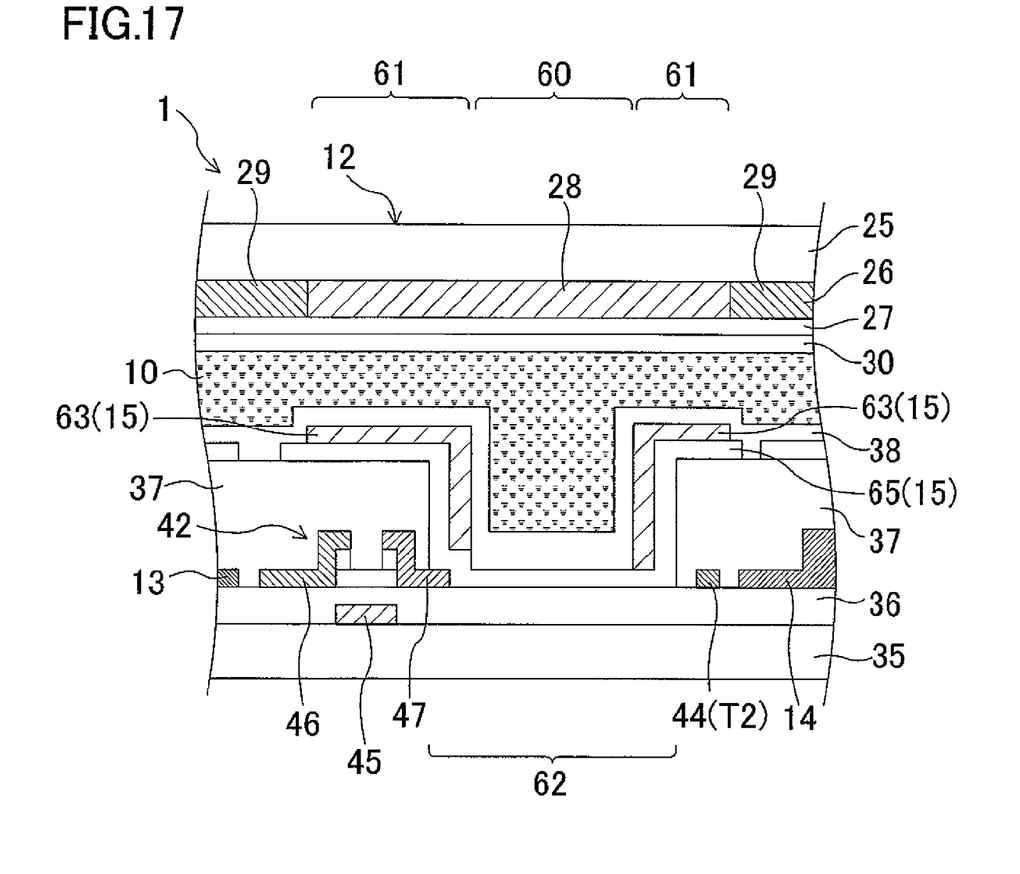
FIG. 17 is a cross-sectional view taken along line XVII-XVII in FIG. 16.
Figure 18:
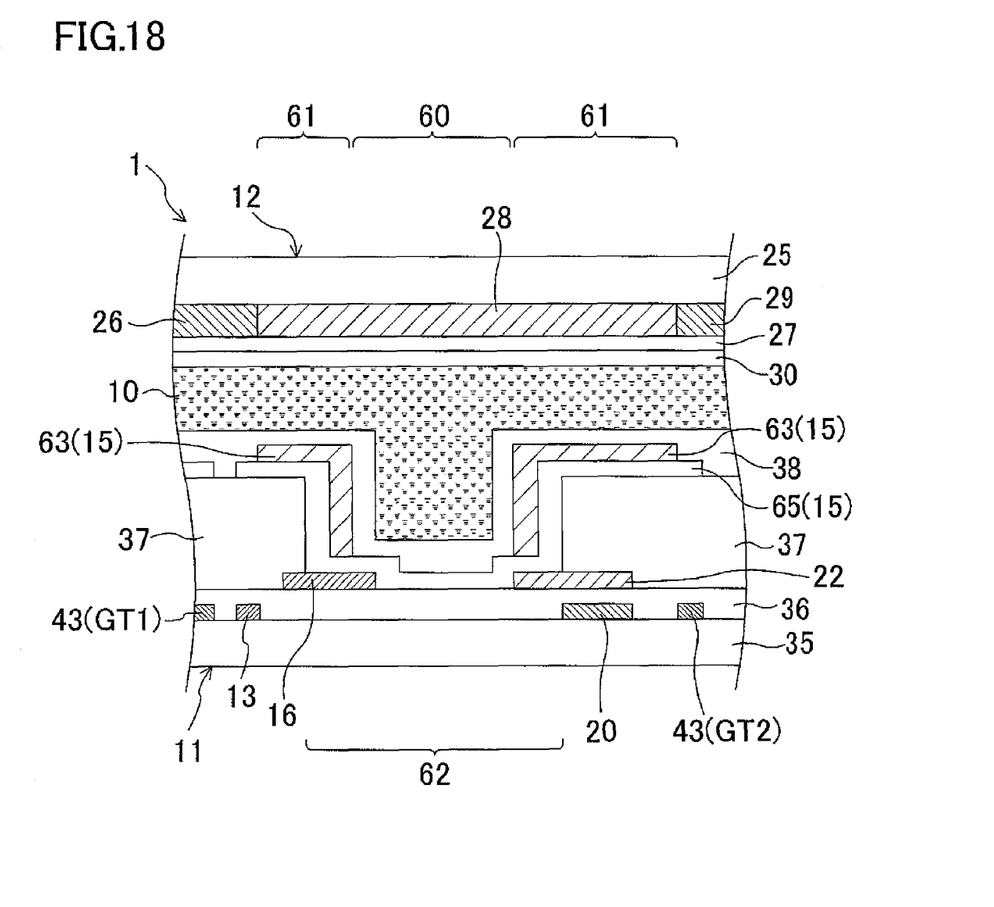
FIG. 18 is a cross-sectional view taken along line XVIII-XVIII in FIG. 16.

FIGS. 16-18 show a seventh embodiment of the present invention.

FIG. 16 is an enlarged plan view of a pixel of an LCD according to the seventh embodiment. FIG. 17 is a cross-sectional view taken along line XVII-XVII in FIG. 16. FIG. 18 is a cross-sectional view taken along line XVIII-XVIII in FIG. 16.

The seventh embodiment is an embodiment in which the configuration of the fourth embodiment has a transflective structure. That is, as shown in FIGS. 16-18, a transmitting region 60 for transmitting light therethrough to provide transmissive display, and a reflecting region 61 for reflecting ambient light to provide reflective display are provided in each pixel 5 of the seventh embodiment.

As shown in FIGS. 16-18, the interlayer insulating film 37 is formed in the TFT substrate 11 so as to cover the TFTs 16 and the detection elements 42, and the transmitting region 60 is formed in a removed region 62, which is a region from which the interlayer insulating film 37 has been removed. Although not shown in the figures, the interlayer insulating film 37 has a concavo-convex surface.

As shown in FIGS. 17-18, a transparent electrode 65, which is made of ITO or the like and serves as the pixel electrode 15, is formed on the sidewall surfaces of the interlayer insulating film 37 defining the removed region 62, and on the surface of the interlayer insulating film 37. A reflective electrode 63 is stacked on the transparent electrode 65 covering the sidewall surfaces of the interlayer insulating film 37, and the surrounding transparent electrode 65. The TFT 16 is covered by the reflective electrode 63 separately and independently of the detection element 42 and the capacitor electrode 22 which are covered by the reflective electrode 63.

As shown in FIG. 16, the capacitor electrode 22 has an extended portion 64 extended into the transmitting region 60, and the extended portion 64 is connected to the transparent electrode 65. The drain electrode 19 of the TFT 16 is also connected to the transparent electrode 65 in the transmitting region 60.

Thus, the pixel electrode 15, which is formed by the transparent electrode 65, is formed in the transmitting region 60, whereas the pixel electrode 15, which is formed by the transparent electrode 65 and the reflective electrode 63, is formed in the reflecting region 61.

The second protruding portion 52 is positioned at the lower left corner of the reflecting region 61 of each pixel 5 in FIG. 16. Thus, the counter electrode 27 under the second protruding portion 52 contacts the reflecting electrode 63 as the pixel electrode 15 when the counter substrate 12 is touched.

Advantages of Seventh Embodiment

According to the seventh embodiment, the detection element 42 is provided in each pixel 5, and the reflecting electrodes 63 as the pixel electrodes 15 serve also as the touch electrodes 41, advantages similar to those of the fourth embodiment can be obtained. Moreover, the touch position detection structure of the present invention is also applicable to the transflective LCD 1.

Moreover, in the reflecting region 61, the pixel electrode 15 (the reflecting electrode 63) is located closer to the counter substrate 12 than in the transmitting region 60 by an amount corresponding to the thickness of the interlayer insulating film 37, and the second protruding portion 52 is provided in the reflecting region 61. Thus, the counter electrode 27 under the second protruding portion 52 can be easily brought into contact with the pixel electrode 15 (the reflecting electrode 63). As a result, the detection accuracy of the touched position can easily increased.

Other Embodiments

The first embodiment of the present invention may be configured as follows.

In each of the above embodiments, the detection element 42 is positioned in every pixel 5. However, the detection element 42 may be positioned in at least two of the pixels 5. Alternatively, the detection element 42 and the touch electrode 41 may be positioned in at least two of the pixels 5.

Instead of the TFTs, other switching elements for allowing or blocking a current flow may be used as the TFTs 16 and the detection elements 42.

Although the seventh embodiment is described with respect to an example in which the fourth embodiment has a transflective structure. However, the present invention is not limited to this, and is similarly applicable to the cases where the other embodiments have a transflective structure.

Although an LCD is described as an example in the above embodiments, the present invention is similarly applicable to other display devices such as, e.g., an organic electroluminescent (EL) display.

INDUSTRIAL APPLICABILITY

As described above, the present invention is useful for display devices for detecting position information on a display screen.

DESCRIPTION OF REFERENCE CHARACTERS

1 LCD
5 Pixel
10 Liquid Crystal Layer (Display Medium Layer)
11 TFT Substrate (First Substrate)
12 Counter Substrate (Second Substrate)
13 Gate Line
14 Source Line
15 Pixel Electrode
16 TFT (Switching Element)
24 Counter Electrode
41 Touch Electrode
42 Detection Element
43 First Detection Line
44 Second Detection Line
51 First Protruding Portion
52 Second Protruding Portion
60 Transmitting Region
61 Reflecting Region
63 Reflective Electrode
65 Transparent Electrode

The invention claimed is:

1. A display device, comprising:
a first substrate;
a second substrate positioned so as to face the first substrate; and
a display medium layer provided between the first substrate and the second substrate, wherein
a counter electrode is formed in the second substrate,
a pixel electrode facing the counter electrode, and a switching element connected to the pixel electrode, for driving and switching the display medium layer, are formed in each of a plurality of pixels in the first substrate,
a touch electrode and a detection element are positioned in at least two of the pixels,
the touch electrode is formed in the first substrate, and is positioned so as to face the counter electrode, and the touch electrode contacts the counter electrode and is electrically connected thereto when the second substrate is pressed and bent toward the first substrate,
the detection element is connected to the touch electrode, and detects the electrical connection between the touch electrode and the counter electrode,
a gate line and a source line extending so as to cross the gate line are connected to the switching element, and
a first detection line extending along the gate line, and the source line are connected to the detection element.

2. A display device, comprising:
a first substrate;
a second substrate positioned so as to face the first substrate; and
a display medium layer provided between the first substrate and the second substrate, wherein
a counter electrode is formed in the second substrate,
a pixel electrode facing the counter electrode, and a switching element connected to the pixel electrode, for driving and switching the display medium layer, are formed in each of a plurality of pixels in the first substrate,
a touch electrode and a detection element are positioned in at least two of the pixels,
the touch electrode is formed in the first substrate, and is positioned so as to face the counter electrode, and the touch electrode contacts the counter electrode and is electrically connected thereto when the second substrate is pressed and bent toward the first substrate,
the detection element is connected to the touch electrode, and detects the electrical connection between the touch electrode and the counter electrode,
a gate line and a source line extending so as to cross the gate line are connected to the switching element, and
the gate line, and a second detection line extending along the source line are connected to the detection element.

3. A display device, comprising:
a first substrate;
a second substrate positioned so as to face the first substrate; and
a display medium layer provided between the first substrate and the second substrate, wherein
a counter electrode is formed in the second substrate,
a pixel electrode facing the counter electrode, and a switching element connected to the pixel electrode, for driving and switching the display medium layer, are formed in each of a plurality of pixels in the first substrate,
at least two of the pixels are configured so that the pixel electrode contacts the counter electrode and is electrically connected thereto when the second substrate is pressed and bent toward the first substrate, and
a detection element connected to the pixel electrode, for detecting the electrical connection between the pixel electrode and the counter electrode, is positioned in the at least two of the pixels.

4. The display device of claim 3,
a protruding portion, protruding toward the first substrate and having its surface covered by the counter electrode, is provided in the second substrate.

5. The display device of claim 4, wherein
a transmitting region and a reflecting region are formed in each of the plurality of pixels, and
the protruding portion is positioned in the reflecting region.

6. The display device of claim 3,
a gate line and a source line extending so as to cross the gate line are connected to the switching element, and
a first detection line extending along the gate line, and a second detection line extending along the source line are connected to the detection element.

7. The display device of claim 3, wherein
a gate line and a source line extending so as to cross the gate line are connected to the switching element, and
a first detection line extending along the gate line, and the source line are connected to the detection element.

8. The display device of claim 3, wherein
a gate line and a source line extending so as to cross the gate line are connected to the switching element, and
the gate line, and a second detection line extending along the source line are connected to the detection element.

9. The display device of claim 3, wherein
the display medium layer is a liquid crystal layer.

* * * * *